United States Patent
Srivastava et al.

(10) Patent No.: US 10,554,814 B1
(45) Date of Patent: Feb. 4, 2020

(54) PRESENTING CONTEXT AND RELEVANCE OF INCOMING CALLS

(71) Applicant: International Business Machines Corporation, Armonk, NY (US)

(72) Inventors: Anurag Srivastava, Pune (IN); Manoj Goyal, Bangalore (IN); Abhijit Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/204,012

(22) Filed: Nov. 29, 2018

(51) Int. Cl.
| H04L 12/58 | (2006.01) |
| H04M 3/436 | (2006.01) |
| H04M 1/57 | (2006.01) |
| H04M 1/22 | (2006.01) |

(52) U.S. Cl.
CPC ........... H04M 3/4365 (2013.01); H04M 1/22 (2013.01); H04M 1/573 (2013.01); H04M 1/575 (2013.01); *H04M 2203/2038* (2013.01); *H04M 2203/2066* (2013.01); *H04M 2203/2072* (2013.01)

(58) Field of Classification Search
CPC ..... H04M 3/4365; H04L 12/58; G06Q 10/109
See application file for complete search history.

(56) References Cited

U.S. PATENT DOCUMENTS

| 9,172,795 | B1 | 10/2015 | Rathod |
| 9,226,049 | B2 | 12/2015 | Grandhi et al. |
| 9,961,521 | B2 | 5/2018 | Lee et al. |
| 2006/0209690 | A1* | 9/2006 | Brooke ............... G06Q 10/109 370/230 |
| 2011/0208816 | A1* | 8/2011 | Chavez ............... G06Q 10/107 709/206 |
| 2018/0152558 | A1 | 5/2018 | Chan et al. |

FOREIGN PATENT DOCUMENTS

GB 2471329 * 12/2010 ............. H04L 12/58

* cited by examiner

*Primary Examiner* — Myron Wyche
(74) *Attorney, Agent, or Firm* — Diana Roberts Gerhardt; Edell, Shapiro & Finnan, LLC

(57) ABSTRACT

First information is captured based on monitoring interactions between a user of a communication device and multiple entities. Second information is determined based on monitoring a schedule including upcoming scheduled activities. An incoming call indication and at least a calling phone number related to an incoming call for the communication device are received. Contextual information related to at least the calling phone number and a relevance factor indicating a level of relevance of the incoming call are determined based on the first information and the second information. An indication of the incoming call, the contextual information, and the relevance factor are provided on the communication device.

20 Claims, 12 Drawing Sheets

US 10,554,814 B1

PRESENTING CONTEXT AND RELEVANCE OF INCOMING CALLS

BACKGROUND

1. Technical Field

Present invention embodiments relate to a method, a communication device, and a computer program product for determining contextual information and a level of relevance of an incoming phone call. In particular, the present invention embodiments relate to a method, a communication device, and a computer program product for determining contextual information and a level of relevance of an incoming phone call to a communication device based on monitored interactions and a monitored schedule including upcoming scheduled activities, and providing an indication of the incoming phone call, the contextual information, and the relevance factor on the communication device.

2. Discussion of Related Art

People receive many phone calls for various offers, products, services, etc. Because many people are too busy to answer these calls, they ignore the calls and assume that the calls are marketing calls for something that is not needed. Often, when answering calls, people realize that the calls concern a product or a service in which they have no interest and that they just wasted their valuable time. Consequently, many people hesitate to answer phone calls from unfamiliar or unavailable phone numbers.

SUMMARY

According to embodiments of the present invention, a method for processing telephone calls is provided. First information is captured based on monitoring interactions between a user of a communication device and multiple entities. Second information based on monitoring a schedule including upcoming scheduled activities is determined. An incoming call indication and at least a calling phone number related to an incoming call for the communication device is received. Based on the first information and the second information, contextual information related to at least the calling phone number and a relevance factor indicating a level of relevance of the incoming call are determined. An indication of the incoming call, the contextual information, and the relevance factor are provided on the communication device.

According to a second embodiment of the invention, a computer program product is provided that includes at least one computer readable storage medium having computer readable program code embodied therewith for execution on at least one processor of a computing device. The computer readable program code is configured to be executed by the at least one processor to perform a number of steps. According to the steps, interaction information from a communication device is received and stored. Schedule information, regarding upcoming activities, is received and stored from the communication device. Information is received, from the communication device, regarding an incoming call to the communication device. The information indicates at least a calling phone number. The stored interaction information and the stored schedule information related to the calling phone number are analyzed. Contextual information and an associated relevance factor having one of a number of levels of relevance are produced as a result of the analyzing. The contextual information and the relevance factor are provided to the communication device.

According to a third aspect of the invention, a communication device is provided. The communication device includes at least one processor and at least one memory connected to the at least one processor. The at least one processor captures first information based on monitoring interactions between a user of the communication device and multiple entities. The at least one processor determines second information based on monitoring a schedule including upcoming scheduled activities. An incoming call indication and at least a calling phone number related to an incoming call for the communication device are received. Based on the first information and the second information, contextual information related to at least the calling phone number and a relevance factor indicating a level of relevance of the incoming call are determined. An indication of the incoming call, the contextual information, and the level of the relevance factor are provided on the communication device.

BRIEF DESCRIPTION OF THE DRAWINGS

Generally, like reference numerals in the various figures are utilized to designate like components.

DETAILED DESCRIPTION

In present invention embodiments, a communication device, a computing device, a method, and a computer program product are provided. An agent executing in a communication device may monitor a user's interactions with various entities and a user's schedule and may provide information regarding the monitored interactions and upcoming scheduled activities to an analytics engine executing on a remote computing device. The interactions may include, but not be limited to, phone calls, text messages, emails, searches, and communications through a social media platform.

The analytics engine may classify the interactions as relating to a particular type of product, service, business opportunity, purchase, etc. and may determine an entity to which each of the interactions relates.

When the communication device receives an incoming call indication, which may include a calling phone number and a name of an entity associated with the calling phone number, the communication device may send a request that includes the calling phone number and may include a name of an associated entity to the analytics engine.

The analytics engine may receive the request and may identify a target entity associated with the calling phone number. The analytics engine may further analyze the interactions and the upcoming scheduled activities to determine a classification of the call, a context, and a relevance factor for the phone call. The analytics engine then may respond to the communication device with the classification, the context and the relevance factor.

The communication device may receive the response and may indicate the classification, the context and the relevance factor to the user of the communication device.

Figure 1:
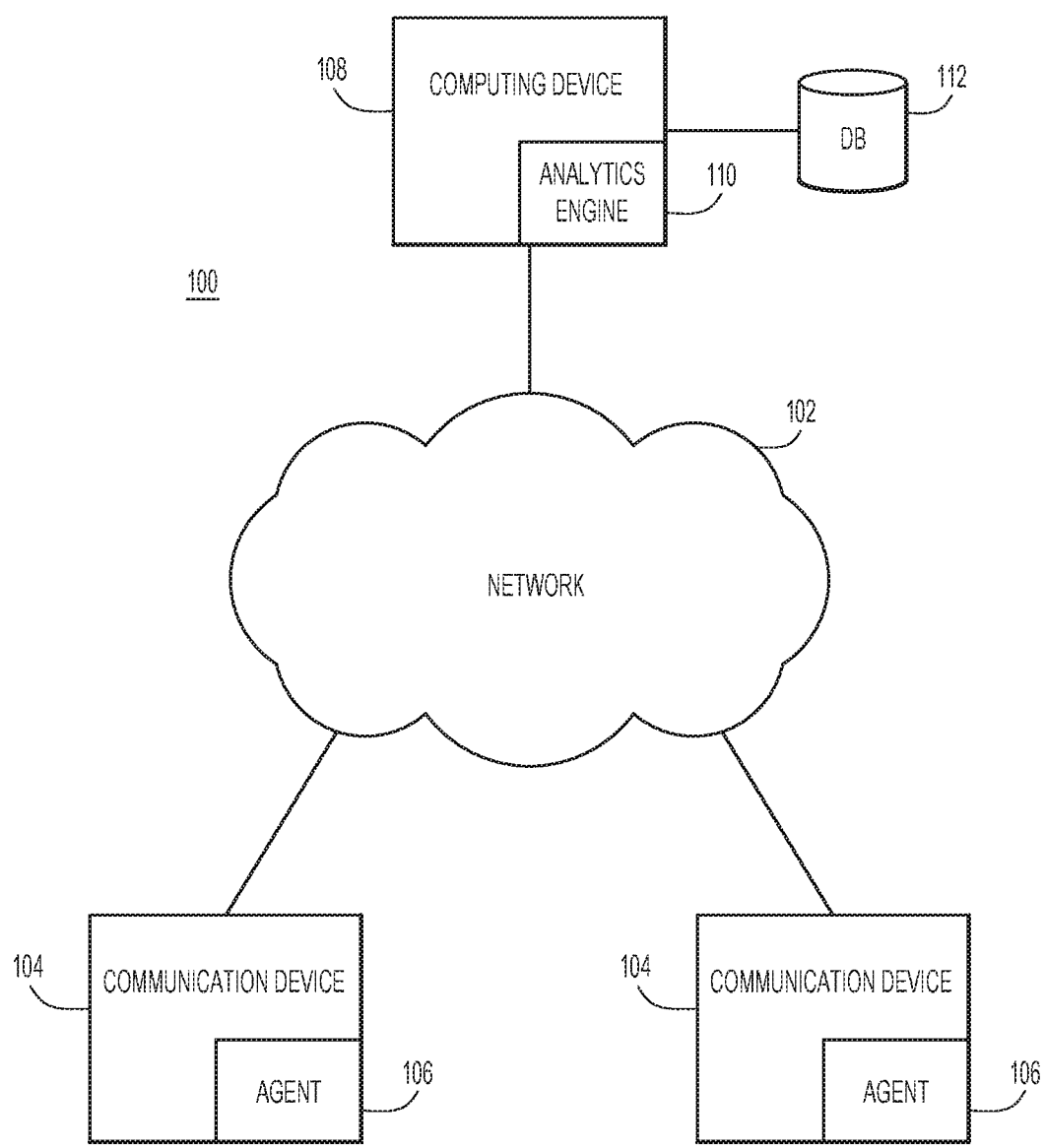
FIG. 1 shows an example operating environment in which various embodiments of the invention may be implemented.

An example environment 100 for use with present invention embodiments is illustrated in FIG. 1. Specifically, environment 100 may include multiple communication devices 104, a network 102 and a computing device 108 remotely located from multiple communication devices 104. Communication devices 104 and computing device 108 communicate with each other via network 102. In some embodiments, computing device 108 may access a database 112 either directly or via network 102 and may execute an analytics engine 110 while computing devices 104 may execute an agent 106. Network 102 may be a wireless network and may be implemented by any number of any suitable communications media such as a public data switched network (PSDN), a radio frequency network, a satellite communication network, a network of networks such as the Internet, or other types of networks or combinations thereof. In some embodiments, computing device 108 may reside in a cloud computing environment.

In some embodiments, computing device 108 may include multiple computing devices in a distributed cloud computing environment where tasks are performed by the multiple computing devices that are linked through a communications network. In a distributed cloud computing environment, program modules may be located in both local and remote computing device storage media including memory storage devices.

Although FIG. 1 shows two communication devices 104, actual operating environments may have more or fewer communication devices 104. In some embodiments, communication devices 104 may include, but not be limited to, a mobile communication device, a desktop computer, a laptop computer, or a tablet computer. In some embodiments, communication devices may include smartphones.

Figure 2:
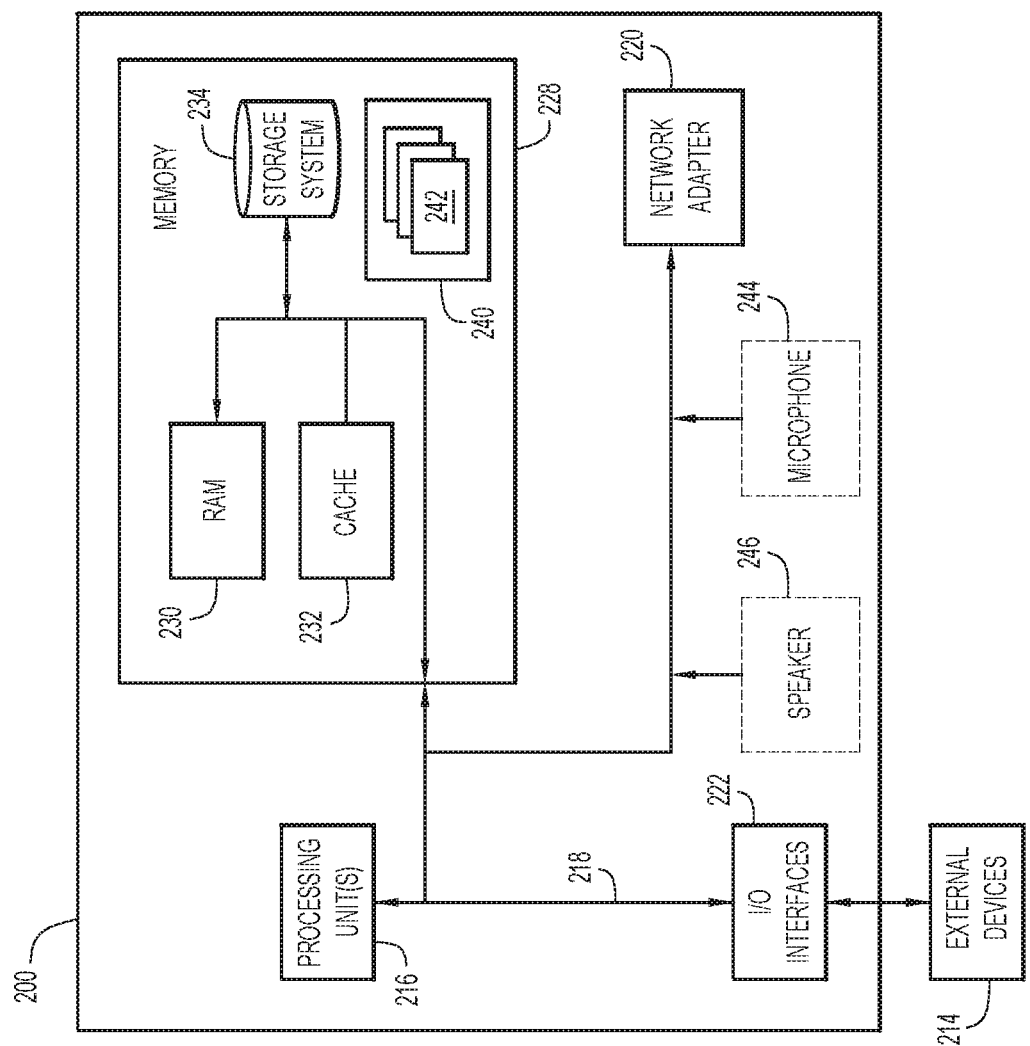
FIG. 2 illustrates an example computer system for implementing a communication device and a computing device according to embodiments of the invention.

Referring now to FIG. 2, a schematic of an example computer system 200 is shown, which may implement communication device 104 or computing device 108 in various embodiments. Computer system 200 is shown in a form of a general-purpose computing device. Components of computer system 200 may include, but are not limited to, one or more processors or processing units 216, a system memory 228, and a bus 218 that couples various system components including system memory 228 to one or more processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 200 may include a variety of computer system readable media. Such media may be any available media that is accessible by computer system 200, and may include both volatile and non-volatile media, removable and non-removable media.

System memory 228 can include computer system readable media in the form of volatile memory, such as random access memory (RAM) 230 and/or cache memory 232. Computer system 200 may further include other removable/non-removable, volatile/non-volatile computer system storage media. By way of example only, storage system 234 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk such as, for example, a "floppy disk", and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having at least one program module that is configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computer system 200 may also communicate with one or more external devices 214 such as a keyboard, a pointing device, one or more displays, one or more devices that enable a user to interact with computer system 200, and/or any devices such as a network card, modem, etc. that enable computer system 200 to communicate with one or more other computing devices. Such communication can occur via Input/Output (I/O) interfaces 222. Still yet, computer system 200 can communicate with one or more networks such as a local area network (LAN), a general wide area network (WAN), a public switched data network (PSDN) and/or a public network such as, for example, the Internet, via network adapter 220. As depicted, network adapter 220 communicates with the other components of computer system 200 via bus 218. When computer system 200 implements communication device 104, computer system 200 may include a speaker 246 and a microphone 244 connected to bus 218. It should be understood that, although not shown, other hardware and/or software components could be used in conjunction with computer system 200. Examples, include, but are not limited to: microcode, device drivers, redundant processing units, external disk drive arrays, RAID systems, tape drives, and data archival storage systems, etc.

Figure 3:
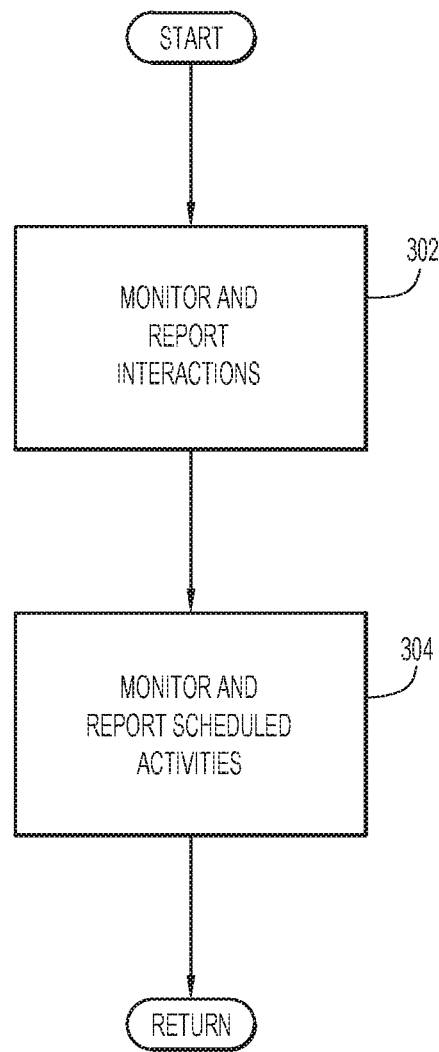
FIG. 3 is a flowchart of an example process performed by an agent executing in a communication device according to embodiments of the invention.

FIG. 3 is a flowchart that illustrates an example process that may be performed by agent 106 executing in communication device 104 in various embodiments. The process may begin with communication device 104 monitoring and reporting interactions by a user of communication device 104 to analytics engine 110 executing in computing device 108 (act 302). The monitored interactions may include, but not be limited to, phone calls made by a user of communication device 104, text messages between the user and multiple entities, email communications between the user and multiple entities, search activities, and social media interactions between the user and multiple entities. Communication device 104 may monitor and report upcoming scheduled activities from a schedule of the user to analytics engine 110 (act 304). The process may be repeated periodically.

Figure 4:
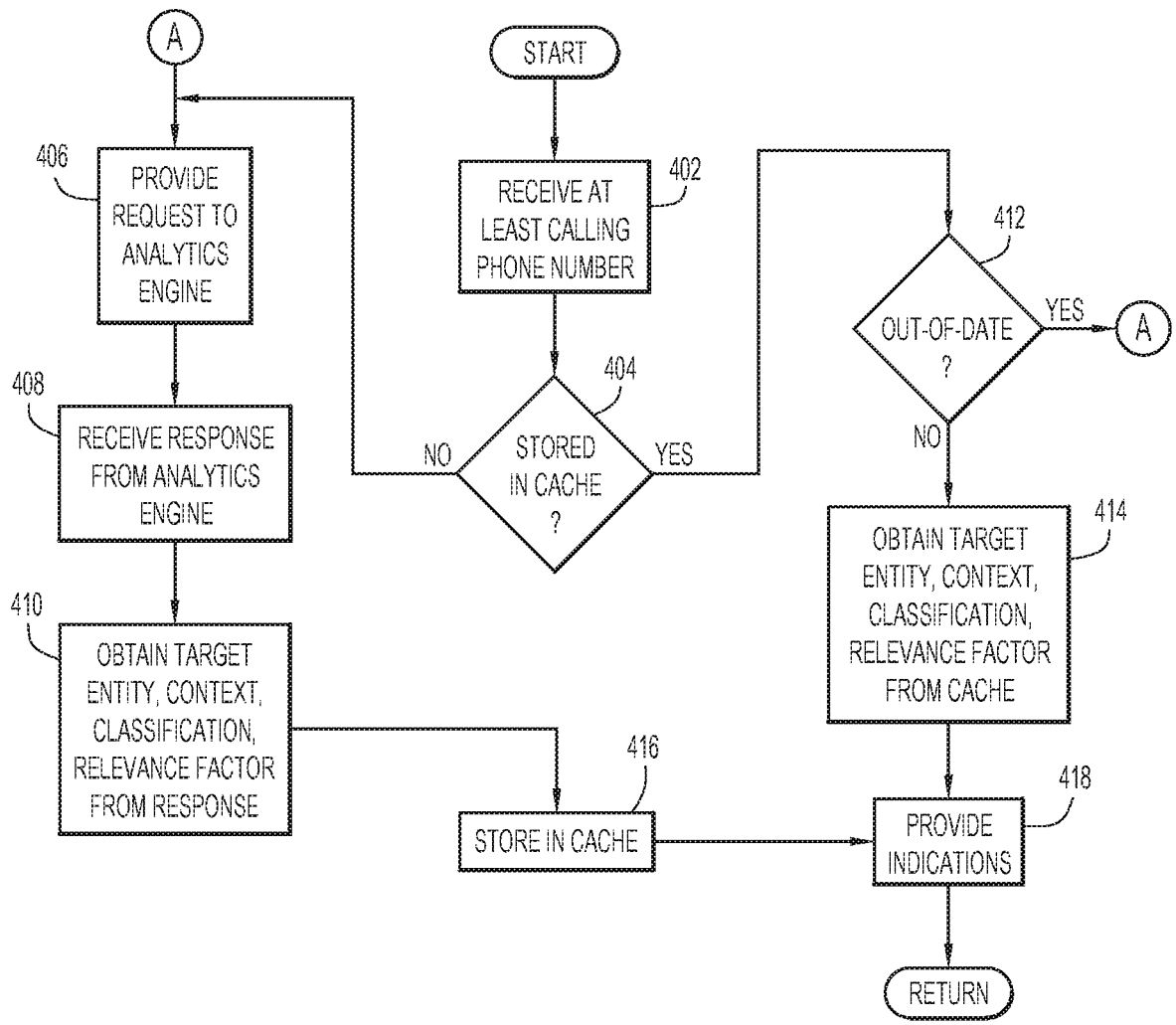
FIG. 4 is a flowchart of an example process performed by a communication device when an incoming call is received according to embodiments of the invention.

FIG. 4 is a flowchart illustrating an example process performed by communication device 104 when an incoming call indication is received. The process may begin with communication device 104 receiving the incoming call indication, which may include at least a calling phone number (act 402). In some embodiments, the incoming call indication may further include a name of a calling entity such as, for example, a company name or a person's name. In other embodiments, the calling phone number and the name of the calling entity may be included in a separate message received by communication device 104 close in time to a time of receipt of the incoming call indication.

Communication device 104 then may determine whether previously received information associated with the calling phone number and the name of the calling entity (if provided) is stored in a cache as a result of a previous related incoming phone call (act 404). If no previously received information associated with the calling phone number and the name of the calling entity (if provided) is stored in the cache, then a request may be provided to analytics engine 110 executing in computing device 108 (act 406). The request may include at least the calling phone number and the name of the calling entity (if provided).

Communication device 104 may receive a response from analytics engine 110, which may include a classification of the call, a name of a target entity, a context, and a level of a relevance factor (act 410). In some embodiments, the response may include a unique context identifier and a timestamp. Communication device 104 may store the response, including the unique context identifier and the timestamp, in a cache (act 416). Communication device 104 may then provide an incoming call indication, a relevance factor indication, contextual information, the classification of the call, and calling entity information (act 418).

The contextual information and the classification of the call may be displayed on a display screen of communication device 104. The relevance factor may have a number of levels as may be configured by the user. Further, communication device 104 provides a facility for the user to indicate a preference for indicating the level of the relevance factor of the incoming call via configurable sounds or ring tones, vibration patterns, and a specific color of a light or light-emitting diode (LED) of communication device 104.

Further, in some embodiments the level of the relevance factor may be displayed on the display screen of communication device 104.

If, during act 404, communication device 104 determines that the previously provided response from analytics engine 110 related to the calling phone number and the name of the calling entity (if provided) is stored in the cache, then communication device 104 may determine whether the previously provided response in the cache is out-of-date (act 412).

In an embodiment in which responses from analytic engine 110 include the unique context identifier and the timestamp, communication device 104 may determine whether the response in the cache is out-of-date by transmitting a second type of request, including the context identifier and the date stamp from the cache, to analytics engine 110. Analytics engine 110 may maintain contextual identifiers and associated timestamps as a result of processing performed by analytics engine 110. Each time analytics engine 110 determines a change to information associated with a contextual identifier, analytics engine 110 may update the associated timestamp to indicate a current date and time. If analytics engine 110 determines that a timestamp in the second request indicates an earlier date and time than a stored timestamp associated with a same context identifier, then analytics engine 110 may respond to the second request with a message indicating that the context identifier from the second request is associated with out-of-date information. Otherwise, analytics engine 110 may respond to the second request with a message indicating that the context identifier from the second request is associated with up-to-date information.

If, during act 412, communication device 104 determines that the information in the cache is out of date, then communication device 104 may again perform acts 406-410, 416 and 418. Otherwise, if communication device 104 determines that the information in the cache is not out-of-date, then communication device 104 may obtain information including a classification of the call, a name of a target entity, a context, and a level of a relevance factor from the cache (act 414). Communication device 104 may then perform act 418 as previously described.

Figure 5:
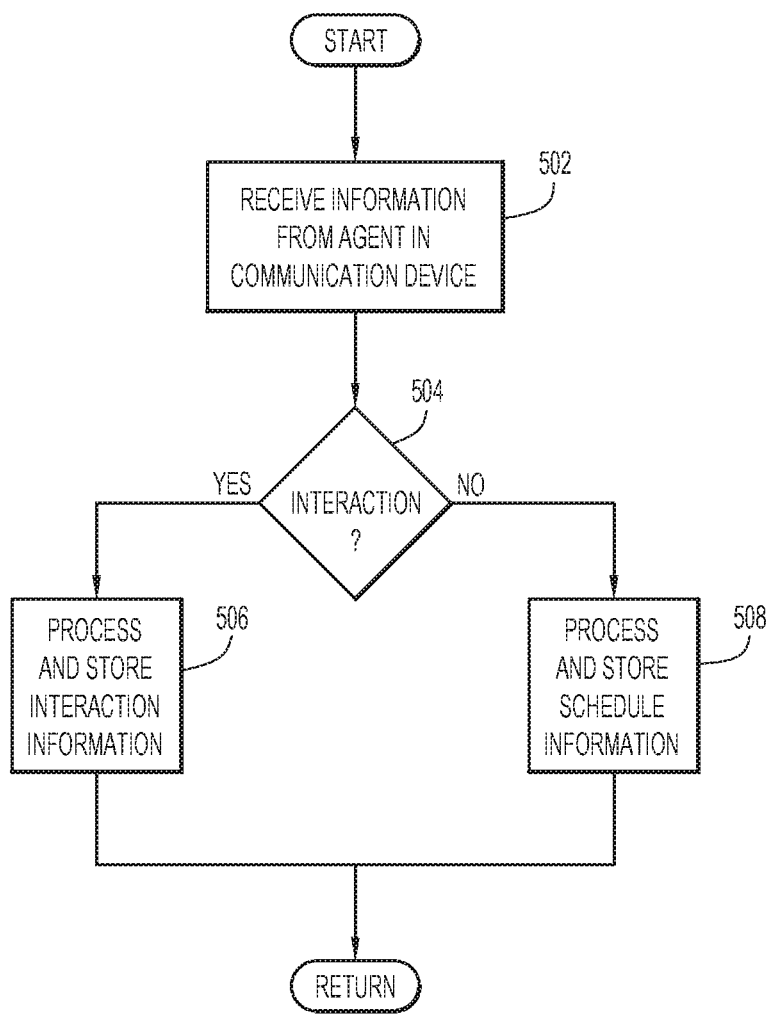
FIG. 5 is a flowchart of an example process performed by an analytics engine executing in a computing device according to embodiments of the invention.

FIG. 5 is a flowchart that illustrates an example process performed by analytics engine 110 when interaction or schedule information is received from agent 106 executing in communication device 104. The process may begin with analytics engine 110 receiving information from agent 106 (act 502). Analytics engine 110 may then determine whether the received information is related to an interaction (act 504). If so, then analytics engine 110 may process and store the interaction information (act 506). If, during act 504, analytics engine 110 determined that the received information is not related to an interaction, then the received information is assumed to be schedule information regarding an upcoming scheduled event and analytics engine 110 may then process and store the schedule information (act 508).

In embodiments in which analytics engine 110 may receive a second request from communication device 104 regarding a request to determine whether a cache entry of communication device 104 is out-of-date, analytics engine 110 may determine whether information associated with the related context identifier has changed as a result of the processing during act 506 or act 508. If the associated information has changed, analytics engine 110 may update a timestamp associated with a corresponding context identifier to indicate a current date and time. As a result, when communication device 110 sends the second request including a context identifier and a timestamp from a cache entry of communication device 104, analytics engine 110 may determine that the cache entry is out-of-date when the time stamp associated with the received context identifier indicates an earlier time that the stored timestamp associated with a matching context identifier.

Figure 6:
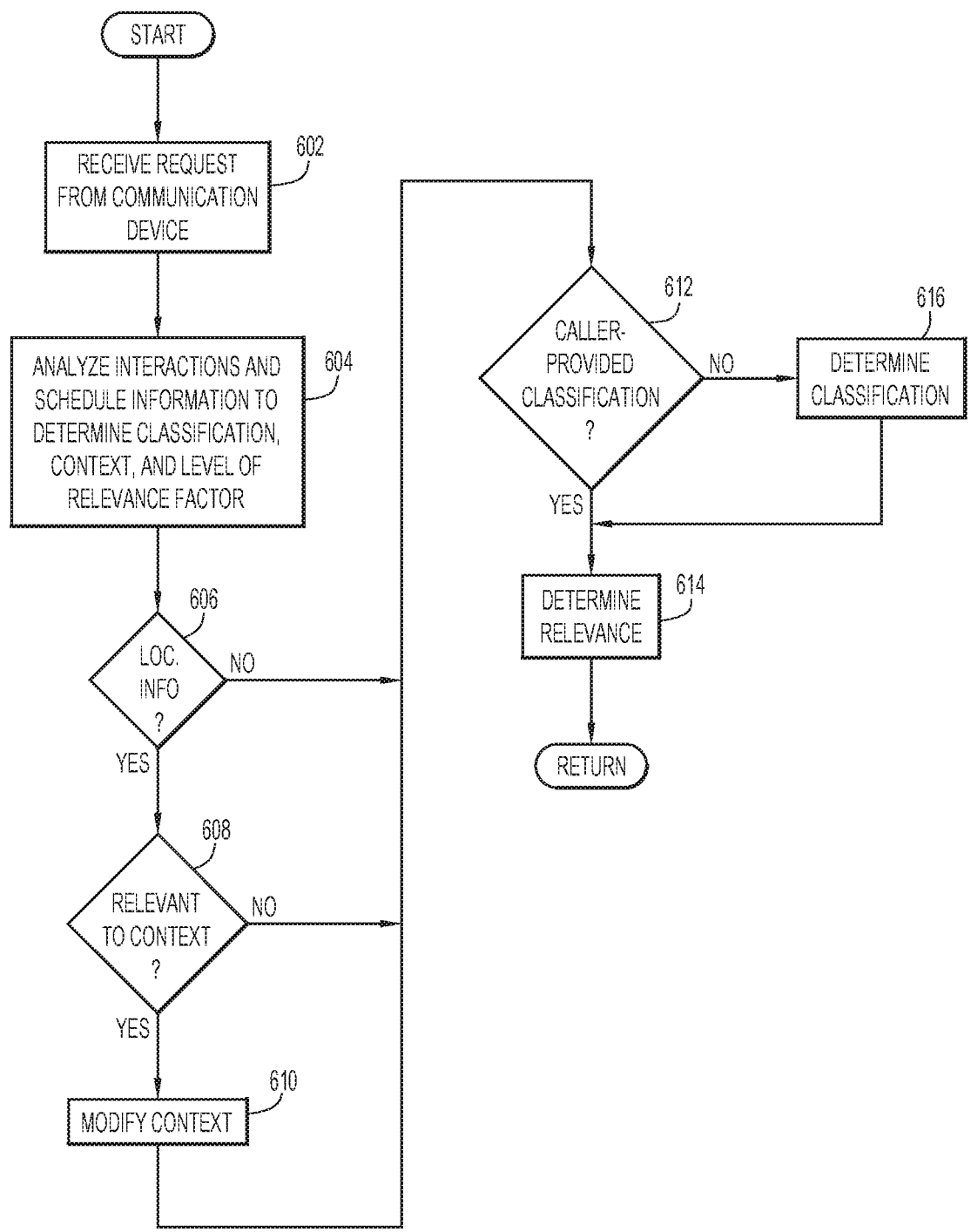
FIG. 6 is a flowchart of an example process, according to embodiments of the invention, performed by an analytics engine executing in a computing device to process a request received from a communication device regarding an incoming call.

FIG. 6 is a flowchart of an example process that may be performed by analytics engine 110 when a request is received from communication device 104 in response to receiving a call indication indicating an incoming phone call. The process may begin with analytics engine 110 receiving the request from communication device 104. The request may include at least a calling phone number and may further include a name of a calling entity. Analytics engine 110 then may analyze interactions and schedule information to determine a classification of the call, a context of the call, and a level of a relevance factor for the call (act 604). In some embodiments, analytics engine 110 may determine whether analytics engine 110 previously determined the classification of the call, the context of the call, and a level of the relevance factor for the call. If so, analytics engine 110 may determine whether the context or the level of relevance factor changed as a result of newly analyzing interactions and schedule information during act 604. If so, then analytics engine 110 may store newly determined information and a timestamp indicating a current time and date.

Analytics engine 110 may further determine whether location information regarding a location of a calling communication device 104 is included with the request (act 606). If so, analytics engine 110 may determine whether the location information is relevant to the context (act 608). As an example, location information may be considered relevant to the context if a user of a called communication device 104 had scheduled to meet a business associate at a particular restaurant, and the called communication device 104 receives a phone call from the business associate at approximately the scheduled meeting time, and location information is received from the calling communication device 104 indicating that the business associate is located at the particular restaurant.

If, during act 608, the location information is determined to be relevant to the context, then analytic engine 110 may modify the context to reflect the location information regarding calling communication device 104 (act 610). For example, if analytics engine 110 had determined the context to be "John Smith, business associate calling," then analytics engine 110 may modify the context to "John Smith, business associate, waiting for you at restaurant for scheduled meeting."

After performing act 610, or after determining that location information is not provided (act 606) or is not relevant to the context (act 608), then analytics engine 110 may determine whether the caller provided a classification for the call, which would be passed through called communication device 104 to analytics engine 110 (act 612). If the caller provided the classification for the call, then analytics engine 110 may accept the caller-provided classification and may determine a level of the relevance factor for the call (act 614). If no classification for the call is provided by calling communication device 104, then analytics engine 110 may determine a classification for the call (act 616) and analytics engine 110 may perform act 614 to determine a level of the relevance factor (act 614).

In some embodiments, a classification for a call may be determined by analytics engine 110 analyzing content of related messages, emails, text messages and social media postings. For example, if several messages concern purchasing a condominium and an incoming call is from a real estate agent, then a new incoming call from a real estate agent may be classified as "condominium".

In some embodiments of the invention, analytics engine 110 may determine a level of the relevance factor for a call based on a number of interactions analytics engine 110 associates with the context of the call and/or a number of days from a current date to a date of an upcoming scheduled event associated with the context of the call. Other embodiments may determine the level of the relevance factor for a call via other methods.

Determination of the level of the relevance factor may also consider a called user's context (e.g. bank balance, any upcoming deposit, bonus, upcoming event, etc.) to categorize the level of the relevance factor as high, low, or another level for the called user. An incoming phone call from a shoe store may have a high level for the relevance factor in the morning when the called user performed a search for a pair of shoes to purchase, while the same incoming call in the evening may have a very low level for the relevance factor after the called user had already purchased the shoes.

Figure 7:
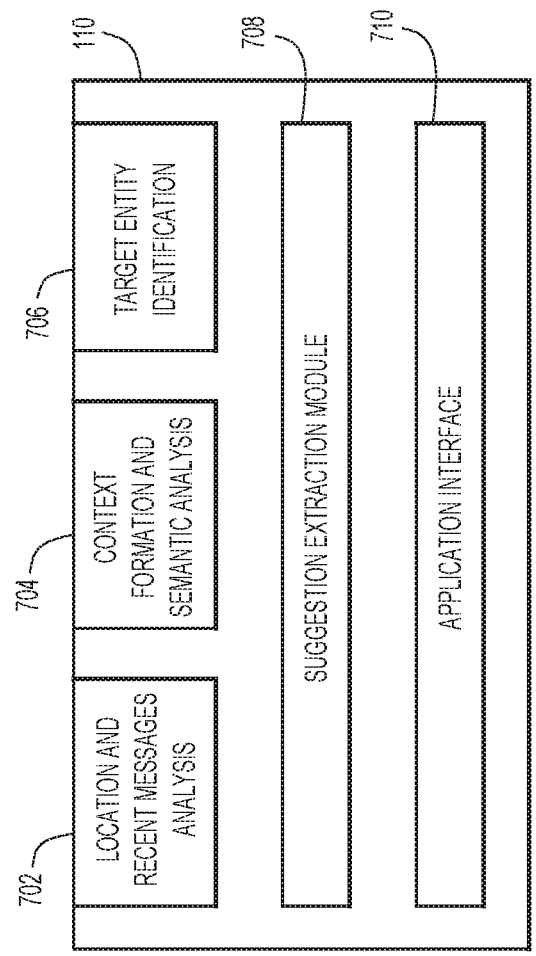
FIG. 7 is a functional block diagram of an analytics engine according to embodiments of the invention.

FIG. 7 is a functional block diagram of analytics engine 110, which illustrates example processing in embodiments of the invention. Analytics engine 110 may perform target entity identification 706 based on a calling phone number, an email address, text messages, schedule information and searches. For example, the user of communication device 104 previously may have performed a search for a two-bedroom condominium in northwest Washington, D.C. A real estate agent calls communication device 104, which provides a calling phone number to analytics engine 110. Target entity identification 706 may search a conversation history for communication device 104 and/or directories on the Internet in order to identify a target or calling entity.

Location and recent messages analysis 702 may analyze location information that may be provided regarding a calling communication device and may analyze recent emails, text messages, communications via a social media platform, etc. to determine a possible relationship to the identified target entity and a classification of a call. Context formation and semantic analysis 704 may begin forming a context based on semantic analysis of recent messages related to the identified target entity and may determine a level of the relevance factor for a call. The recent messages may include emails, text messages, communications via social media platform, etc. Suggestion extraction module 708 may analyze the forming context to produce a summary of the context, which suggestion extraction module 708 may provide to application interface 710. Application interface 710 may transmit the summary of the context, the target entity identification, as well as other information to communication device 104.

Figure 8:
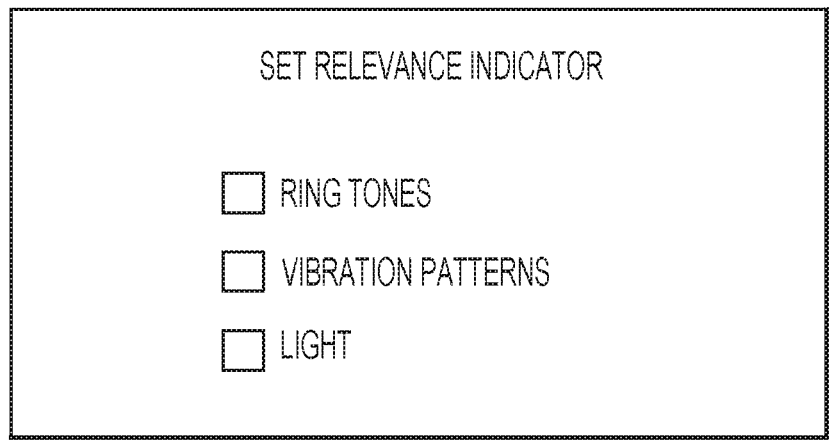
FIG. 8 illustrates an example display screen for a user to configure how a communication device is to indicate a level of a relevance factor with respect to a phone call according to embodiments of the invention.

As mentioned previously, in various embodiments, a user of communication device 104 may configure how a level of the relevance factor is to be indicated. FIG. 8 shows an example display screen that may be displayed on a display of communication device 104 to configure how the level of the relevance factor is to be indicated. In the example display of FIG. 8, the user may select one of ring tones, vibration patterns and light.

Figure 9:
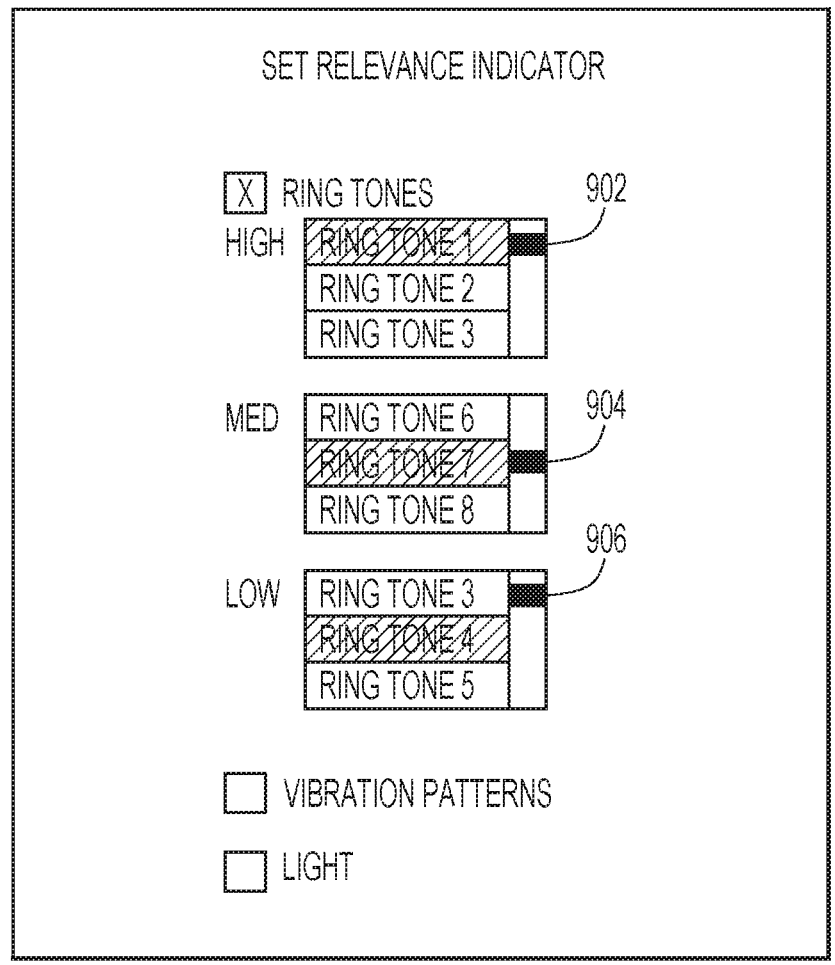
FIG. 9 illustrates an example display screen for a user to configure respective ring tones for indicating corresponding levels of a relevance factor of a phone call according to embodiments of the invention.

FIG. 9 shows an example display screen that may be displayed by communication device 104 when the user selects ring tones as a method by which the level of relevance factor is to be indicated. In this example, a level of relevance factor may be one of high, medium, and low. In various embodiments, a user of communication device 104 may configure a number of levels of the relevance factor.

Upon selecting ring tones, a menu for selecting a respective ring tone for each of the levels of the relevance factor may be displayed by communication device 104. If a number of ring tones is too numerous to display simultaneously, then a respective scroll indicator 902, 904, 906 may be presented, which may be selected and moved via use of a pointing device to scroll a list of ring tone candidates for each of the levels of the relevance factor. In some embodiments, the pointing device may be a user's finger. FIG. 9 shows that ring tone 1 is selected for a high level of the relevance factor, ring tone 7 is selected for a medium level of the relevance factor, and ring tone 4 is selected for a low level of the relevance factor.

Figure 10:
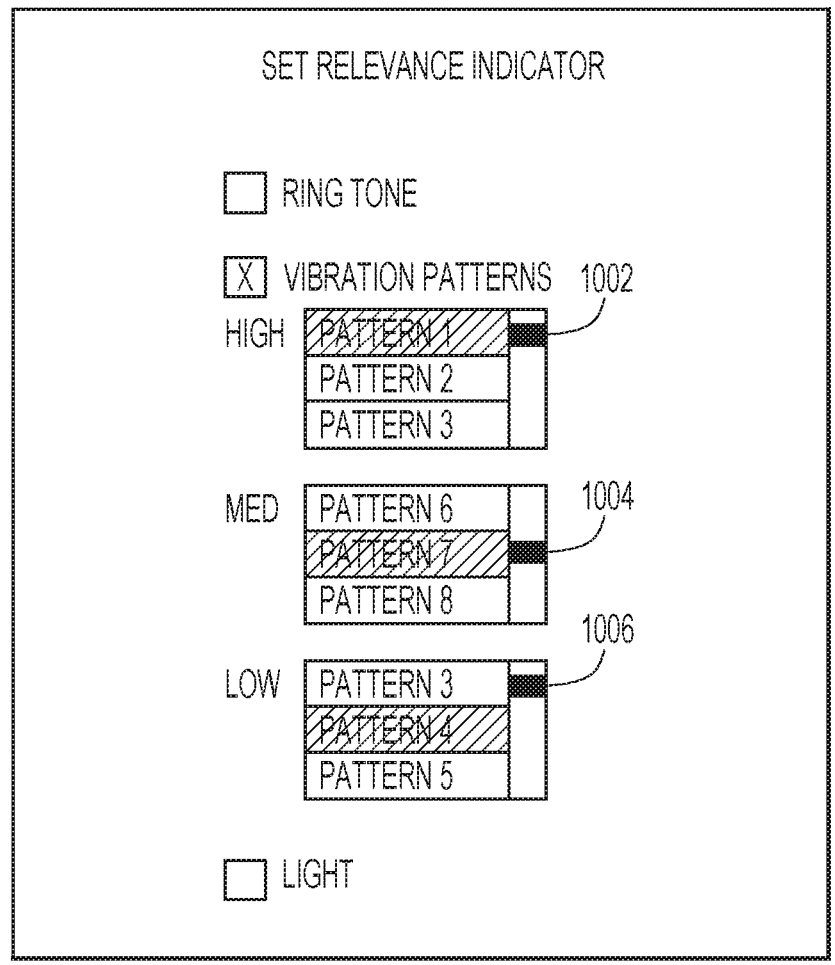
FIG. 10 illustrates an example display screen for a user to configure respective vibration patterns for indicating corresponding levels of a relevance factor of a phone call according to embodiments of the invention.

FIG. 10 shows an example display screen that may be displayed by communication device 104 when the user selects vibration patterns as a method by which the level of relevance factor is to be indicated. Upon selecting vibration patterns, a menu for selecting a respective vibration pattern for each of the levels of the relevance factor may be displayed by communication device 104. If a number of vibration patterns is too numerous to display simultaneously, then a respective scroll indicator 1002, 1004, 1006, may be selected and moved via use of the pointing device to scroll a list of vibration pattern candidates for each of the levels of the relevance factor. FIG. 10 shows that vibration pattern 1 is selected for a high level of the relevance factor, vibration pattern 7 is selected for a medium level of the relevance factor, and vibration pattern 4 is selected for a low level of the relevance factor.

Figure 11:
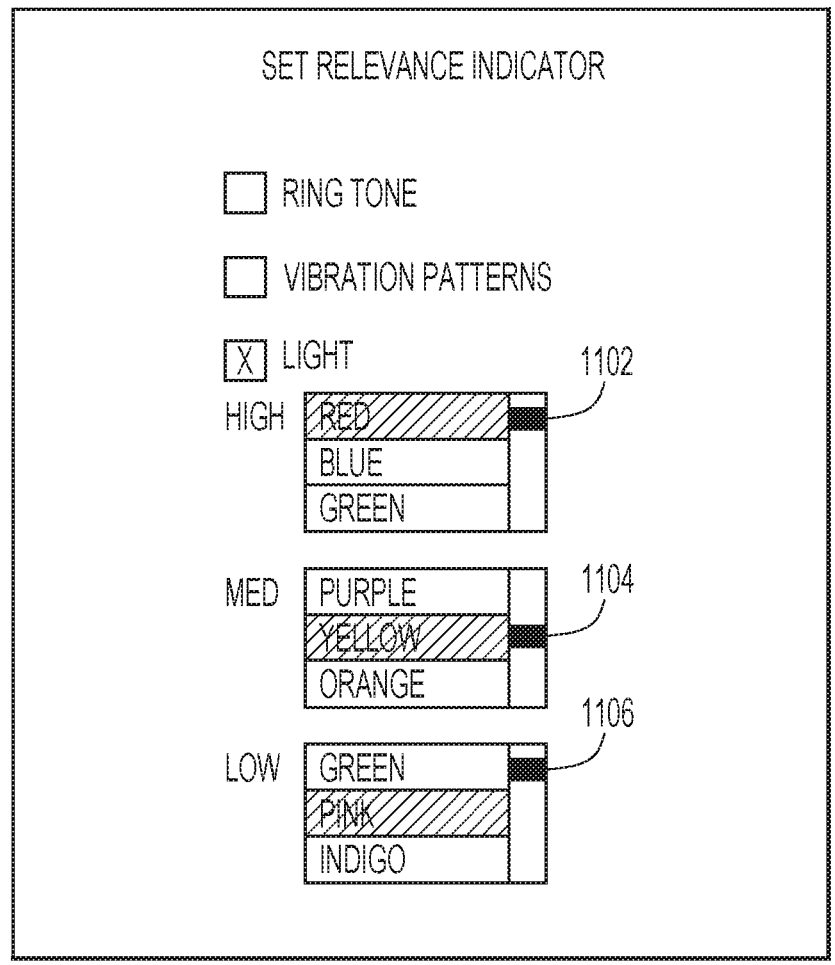
FIG. 11 illustrates an example display screen for a user to configure respective colored lights for indicating corresponding levels of a relevance factor of a phone call according to embodiments of the invention.

FIG. 11 shows an example display screen that may be displayed by communication device 104 when the user selects light as a method by which the level of relevance factor is to be indicated. Upon selecting light, a menu for selecting a respective colored light for each of the levels of the relevance factor may be displayed by communication device 104. If a number of colored lights is too numerous to display simultaneously, then a respective scroll indicator 1102, 1104, 1106 may be selected and moved via use of the pointing device to scroll a list of colored light candidates for each of the levels of the relevance factor. FIG. 11 shows that a red light is selected for a high level of the relevance factor, a yellow light is selected for a medium level of the relevance factor, and a pink light is selected for a low level of the relevance factor.

Figure 12:
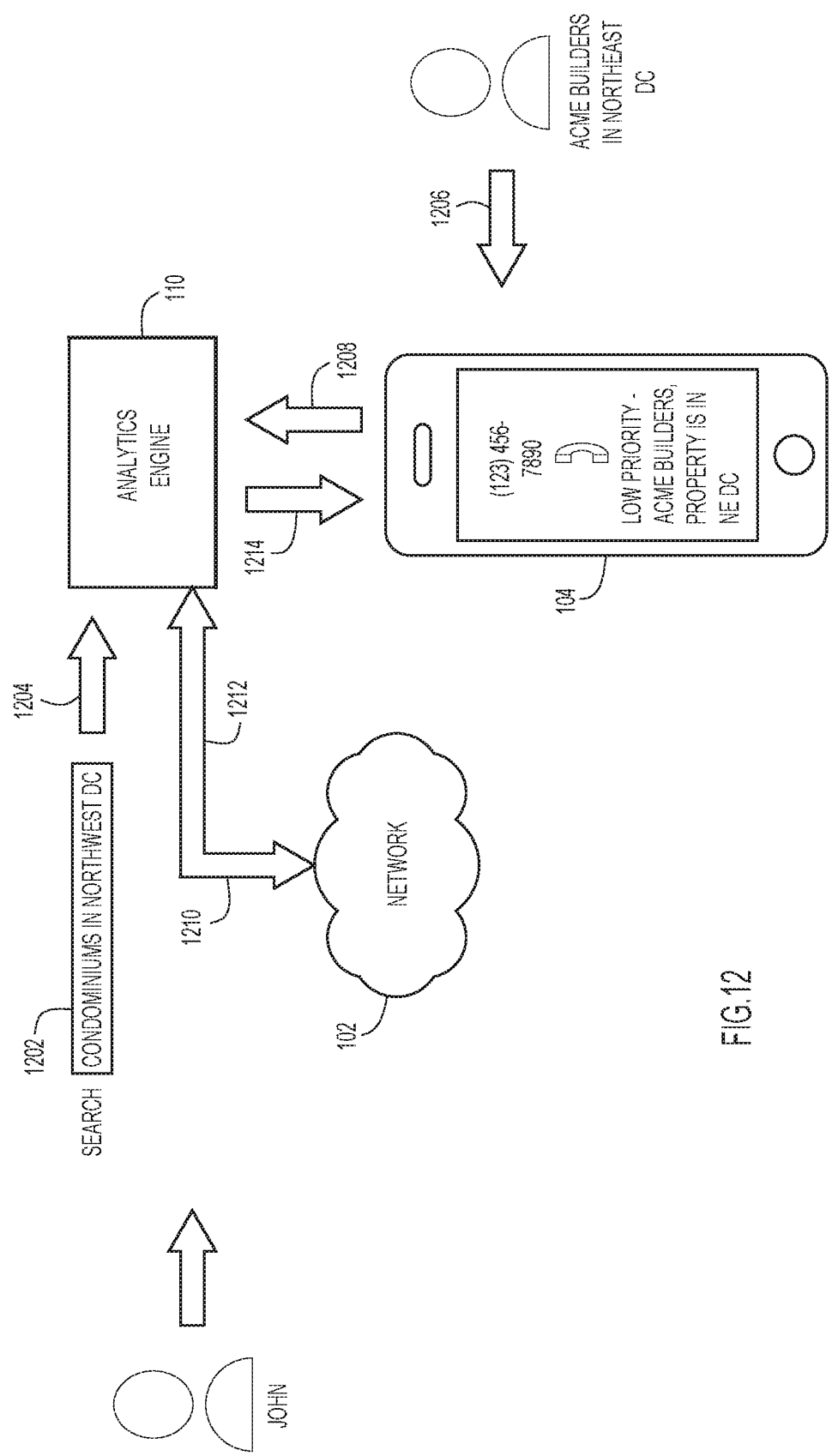
FIG. 12 illustrates an example operation according to various embodiments of the invention.

FIG. 12 illustrates an example operation according to various embodiments of the invention. At step 1202, John performs a network search for condominiums in the Northwest section of Washington, D.C. In this example, network 102 may include the Internet. At step 1204, information regarding an interaction such as, search activity regarding "condominiums in Northwest DC" is provided to analytics engine 110. At 1206, John's communication device 104 receives an incoming call indication and at least a calling phone number. At step 1208, John's communication device 104 sends a request including at least the calling phone number to analytics engine 110. Analytics engine 110 may perform a search (step 1210) of a conversation history and/or a network directory search for the calling phone number to identify a calling entity, Acme Builders in Northeast Washington, D.C. (step 1212), who has a new project in Northeast Washington, D.C. Analytics engine 110 determines contextual information and a level of a relevance factor based on analyzing interactions and upcoming scheduled activities and determines that the level of the relevance factor is "Low Priority", and the contextual information, "Property is in NE DC", which is provided to John's communication device 104 (step 1214). Optionally, analytics engine 110 may determine a classification of the incoming call such as, for example, "real estate", which may be provided to John's communication device 104.

In various implementations, the light may be a light-emitting diode (LED). When indicating the level of relevance, the light may be flashing in some embodiments and may be solidly lit in other embodiments. Optionally, a user may configure communication device 104 to indicate a preference for either a solid light or a flashing light.

It will be appreciated that the embodiments described above and illustrated in the drawings represent only a few of the many ways of implementing the various embodiments of the invention.

The environment of the present invention embodiments may include any number of computer or other processing systems such as client or end-user systems, server systems, etc. and databases or other repositories arranged in any desired fashion, where the present invention embodiments may be applied to any desired type of computing environment such as cloud computing, client-server, network computing, mainframe, etc. The computer or other processing systems employed by the present invention embodiments may be implemented by any number of any personal or other type of computer or processing system such as desktop, laptop, PDA, mobile devices, etc., and may include any commercially available operating system and any combination of commercially available and custom software such as, for example, browser software, communications software, and server software. These systems may include any types of monitors and input devices such as keyboard, mouse, voice recognition, etc. to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium such as a LAN, WAN, Intranet, Internet, hardwire, modem connection, wireless, etc. For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium, such as magnetic or optical media, magneto-optic media, floppy diskettes, CD-ROM, DVD, memory devices, etc., of a stationary or portable program product apparatus or device for use with systems connected by a network or other communications medium.

The communication network may be implemented by any number of any type of communications network such as a LAN, WAN, Internet, Intranet, VPN, etc. The computer or other processing systems of the present invention embodiments may include any conventional or other communications devices to communicate over the network via any conventional or other protocols. The computer or other processing systems may utilize any type of connection, such as a wired, wireless, etc., for access to the network. Local communication media may be implemented by any suitable communication media such as a local area network (LAN), hardwire, wireless link, Intranet, etc.

The system may employ any number of any conventional or other databases, data stores or storage structures, such as files, databases, data structures, data or other repositories, etc., to store information. The database system may be implemented by any number of any conventional or other databases, data stores or storage structures, such as files, databases, data structures, data or other repositories, etc., to store information. The database system may be included within or coupled to a server and/or client systems. The database systems and/or storage structures may be remote from or local to the computer or other processing systems, and may store any desired data.

The present invention embodiments may employ any number of any type of user interface, such as a Graphical User Interface (GUI), command-line, prompt, etc., for obtaining or providing information, where the interface may include any information arranged in any fashion. The interface may include any number of any types of input or actuation mechanisms, such as buttons, icons, fields, boxes, links, etc., disposed at any locations to enter/display information and initiate desired actions via any suitable input devices such as a mouse, keyboard, etc. The interface screens may include any suitable actuators, such as links, tabs, etc., to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media, such as light pulses passing through a fiber-optic cable or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for processing telephone calls, the method comprising:
   capturing, by a communication device, first information based on monitoring interactions between a user of the communication device and a plurality of entities;
   determining, by the communication device, second information based on monitoring a schedule including upcoming scheduled activities;
   receiving, by the communication device, an incoming call indication and at least a calling phone number related to an incoming call for the communication device;
   responsive to determining that previously received information associated with the calling phone number is stored in a memory of the communication device and is not out-of-date based on timestamps, obtaining, by the communication device from the previously received information, contextual information related to at least the calling phone number and a relevance factor indicating a level of relevance of the incoming call, the contextual information and the relevance factor being based on the first information and the second information;
   responsive to determining that the previously received information is out-of-date based on the timestamps, performing, by the communication device:
      requesting and receiving, from a remote computing device, the context information and the relevance factor related to the at least the calling phone number, and
      storing the context information and the relevance factor in the memory; and
   providing on the communication device an indication of the incoming call, the contextual information, and the relevance factor.

2. The method of claim 1, wherein:
   the memory includes a cache, and
   the context information and the relevance factor are stored in the cache; and
   the method further comprises:
      receiving, at the communication device, a second incoming call indication and at least a second calling phone number related to a second incoming call;
      determining, in response to the receiving the second incoming call indication, that second contextual information and a second relevance factor related to at least the second calling phone number is stored in the cache; and
      providing, on the communication device, an indication of the second incoming call, the second contextual information, and the second relevance factor.

3. The method of claim 1, wherein the indication of the incoming call is a user configurable sound.

4. The method of claim 1, wherein the indication of the relevance factor is one of a plurality of user-configurable vibration patterns, each vibration pattern of the plurality of user-configurable vibration patterns indicating a respective level of relevance of the relevance factor.

5. The method of claim 1, wherein the indication of the relevance factor is a turning on of a light of the communication device, a color of the light indicating a level of relevance of the relevance factor.

6. The method of claim 5, wherein the light is a flashing light.

7. The method of claim 1, wherein the contextual information is provided via one of a display screen of the communication device and computer generated speech via a speaker of the communication device.

8. A computer program product comprising at least one computer readable storage medium having computer readable program code embodied therewith for execution on at least one processor of a computing device, the computer readable program code being configured to be executed by the at least one processor to perform:

receiving and storing interaction information from a communication device;

receiving and storing schedule information from the communication device regarding upcoming activities;

receiving information regarding an incoming call to a communication device from the communication device indicating at least a calling phone number;

analyzing the stored interaction information and the stored schedule information related to the calling phone number;

producing contextual information and an associated relevance factor having one of a plurality of levels of relevance as a result of the analyzing;

responsive to receiving a request related to the calling phone number from the communication device, determining whether one or more of the contextual information and the relevance factor changed as a result of newly analyzing the stored interaction information and the stored schedule information related to the calling phone number;

when the one or more of the contextual information and the relevance factor is determined to have changed as a result of the newly analyzing the stored interaction information:
storing determined changed information and a timestamp including a current date and time;

responsive to receiving a first request from the communication device, providing the contextual information, the relevance factor, and the timestamp to the communication device; and responsive to receiving, from the communication device, a second request related to the calling phone number and including a second timestamp, performing:
determining whether related information in the communication device is out-of-date based on the second timestamp and the stored timestamp, and
when the related information is determined to be out-of-date, providing, to the communication device, an indication that the related information is out-of-date.

9. The computer program product of claim 8, wherein the interaction information is related to one or more from a group of an email, a text message, a phone call, searching activity, and social media activity.

10. The computer program product of claim 8, wherein the computer readable program code is further configured to be executed by the at least one processor to perform:
receiving, from the communication device, current location information of a second communication device that is calling the communication device, wherein
the analyzing further analyzes the current location information of the second communication device to determine an association with any of the stored interaction information and the stored schedule information.

11. The computer program product of claim 8, wherein the producing of the associated relevance factor further comprises:
determining the one of the plurality of levels of relevance of the associated relevance factor based on one or more of a quantity of interactions related to the contextual information and a closeness of a current date to a date of an upcoming activity related to the contextual information.

12. The computer program product of claim 11, wherein the computer readable program code is further configured to be executed by the at least one processor to perform:
receiving, from the communication device, a user definition of each of the plurality of levels of relevance.

13. The computer program product of claim 8, wherein the computer readable program code is further configured to be executed by the at least one processor to perform:
classifying the call based on a type of either a product or a service related to the call.

14. The computer program product of claim 8, wherein the computer readable program code is further configured to be executed by the at least one processor to perform:
classifying the call based on classification information originating from a calling communication device and included in the received information regarding the call to the communication device.

15. A communication device comprising:
at least one processor; and
at least one memory connected to the at least one processor, wherein the at least one processor is configured to perform:
capturing first information based on monitoring interactions between a user of the communication device and a plurality of entities;
determining second information based on monitoring a schedule including upcoming scheduled activities;
receiving an incoming call indication and at least a calling phone number related to an incoming call for the communication device;
responsive to determining that previously received information associated with the calling phone number is stored in a memory of the communication device and is not out-of-date based on timestamps, obtaining, from the previously received information, contextual information related to at least the calling phone number and a relevance factor indicating a level of relevance of the incoming call, the contextual information and the relevance factor being based on the first information and the second information;
responsive to determining that the previously received information is out-of-date based on the timestamps, performing, by the communication device:
requesting and receiving, from a remote computing device, the context information and the relevance factor related to the at least the calling phone number, and
storing the context information and the relevance factor in the memory; and
providing on the communication device an indication of the incoming call, the contextual information, and the level of the relevance factor.

16. The communication device of claim 15, wherein:
the memory includes a cache, and
and the at least one processor is configured to store the context information and the relevance factor in the cache; and
the at least one processor is further configured to perform:

receiving a second incoming call indication and at least a second calling phone number related to a second incoming call;

determining, in response to the receiving the second incoming call indication, that second contextual information and a second relevance factor related to at least the second calling phone number is stored in the cache; and providing, on the communication device, an indication of the second incoming call, the second contextual information, and the second relevance factor.

17. The communication device of claim 15, wherein the indication of the relevance factor is a user configurable sound indicating a level of the relevance factor.

18. The communication device of claim 15, wherein the indication of the relevance factor is one of a plurality of user-configurable vibration patterns, each vibration pattern of the plurality of user-configurable vibration patterns indicating a respective level of relevance of the relevance factor.

19. The communication device of claim 15, wherein the monitored interactions include emails, text messages, phone calls, searching activity, and social media activity.

20. The communication device of claim 15, wherein the at least one processor is further configured to provide a facility for a user of the communication device to classify an outgoing call.

* * * * *